United States Patent [19]
Lasko

[11] Patent Number: 5,863,159
[45] Date of Patent: Jan. 26, 1999

[54] DRILL ANGLE ATTACHMENT COUPLING

[76] Inventor: Leonard J. Lasko, 324 N. Lincoln Ave., Villa Park, Ill. 60181

[21] Appl. No.: 989,814

[22] Filed: Dec. 12, 1997

[51] Int. Cl.⁶ .................................................. B23B 39/10
[52] U.S. Cl. ......................... 408/124; 74/417; 81/57.13; 81/57.29; 279/143
[58] Field of Search ........................ 279/143; 409/215; 408/241 R, 238 R, 239 R, 239 A, 240, 124; 810/57.13, 57.29; 74/417

[56] References Cited

U.S. PATENT DOCUMENTS

| | | | |
|---|---|---|---|
| 2,348,266 | 5/1944 | Selby . | |
| 2,465,309 | 3/1949 | Happe et al. | 51/170 |
| 2,589,822 | 3/1952 | Kostka | 74/423 |
| 2,604,795 | 7/1952 | Ristow | 74/417 |
| 2,669,162 | 2/1954 | Arliss | 409/144 |
| 2,697,362 | 12/1954 | Keesling | 74/417 |
| 2,780,942 | 2/1957 | Babcock | 74/417 |
| 3,004,569 | 10/1961 | Dietrich | 173/165 |

*Primary Examiner*—Daniel W. Howell
*Assistant Examiner*—Monica Smith
*Attorney, Agent, or Firm*—Don Moyer

[57] ABSTRACT

An angle attachment is attached to a drill without removing the drill chuck by securing the shaft of a coupler in the drill chuck and seating the coupler on the nut of either shaft of the angle attachment, securing the angle attachment to the drill with a sleeve, and threading an attachment chuck onto the shaft of the angle attachment which is not coupled to the drill chuck

7 Claims, 1 Drawing Sheet

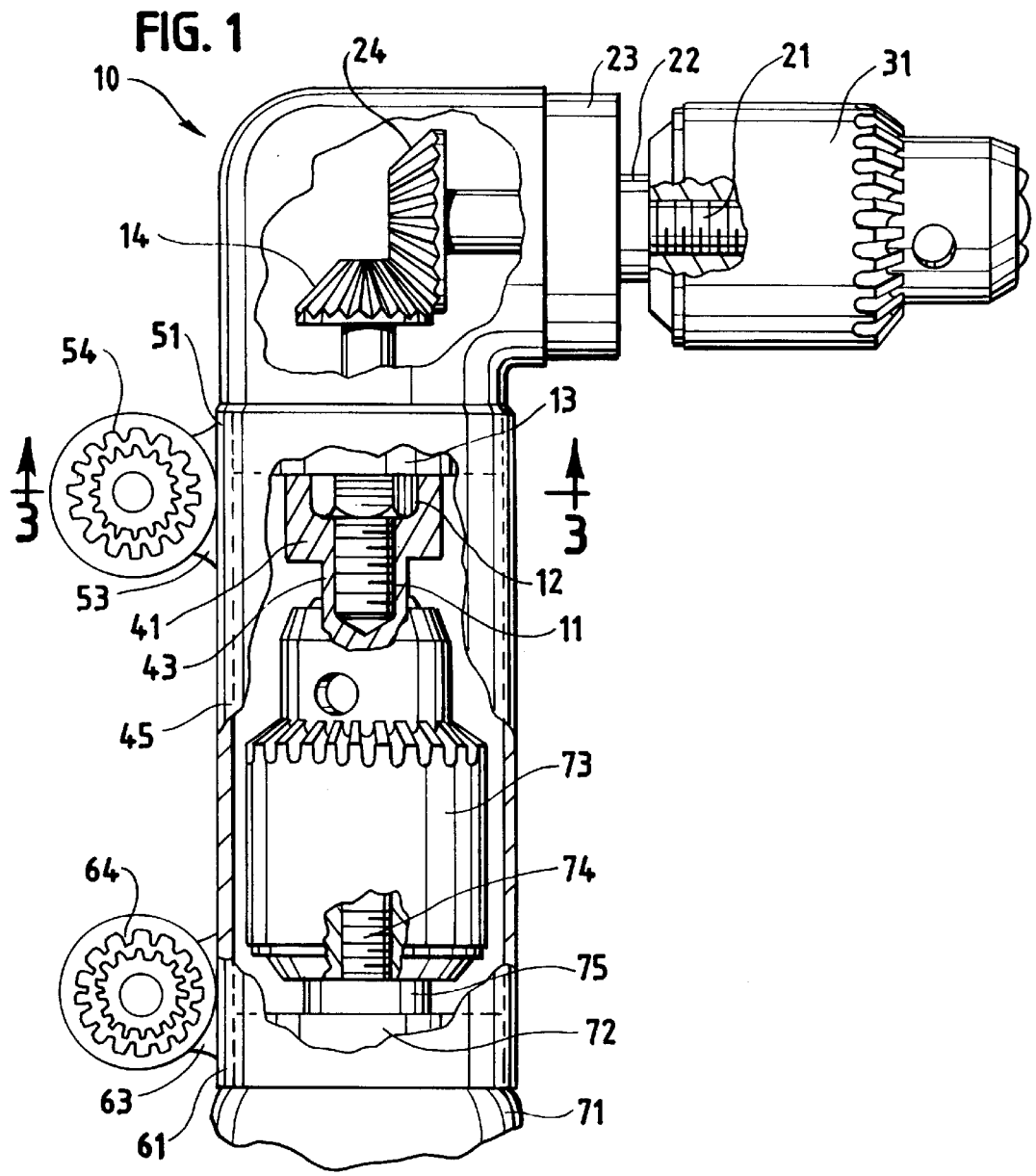
FIG. 1
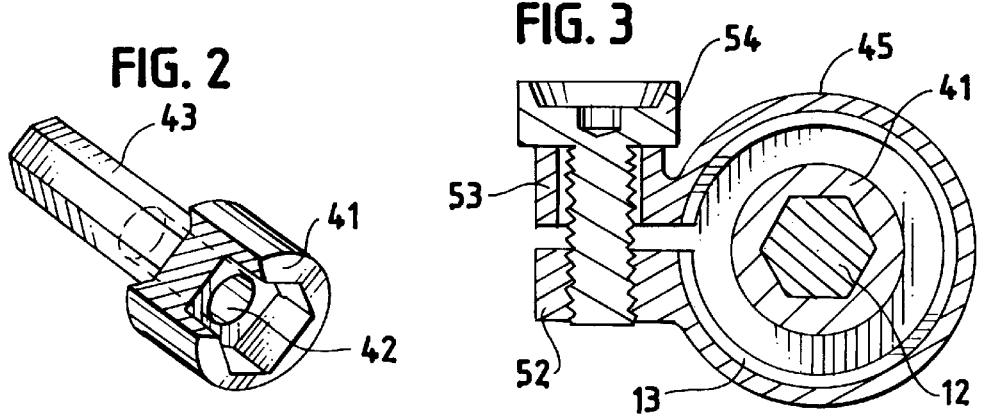
FIG. 2
FIG. 3

DRILL ANGLE ATTACHMENT COUPLING

BACKGROUND OF THE INVENTION

The invention couples an angle attachment to a drill without removing the drill chuck from the drill.

Existing drill angle attachments are coupled to a drill by removing the drill chuck from the drill output shaft, linking the nut on either angle attachment shaft to the corresponding nut on the drill output shaft, securing the body of the angle attachment to the body of the drill by tightening a sleeve connector, and attaching the drill chuck to the shaft of the angle attachment not linked to the drill output shaft. This method has several disadvantages. Removing and reattaching the drill chuck consumes valuable time. Removing the drill chuck can be very difficult when the chuck has been very firmly attached by use of the drill. Many workers resolve these difficulties by keeping two drills—one with an angle attachment secured and one without. A better solution is provided by this invention. This invention preserves securing the angle attachment to the drill by a sleeve connector and preserves the ability to couple either shaft of the angle attachment to the drill, but does not require removing the drill chuck.

Inventions related to angle attachments shown in prior art do not suggest this solution. The devices shown in U.S. Pat. No. 2,348,266 Selby, in U.S. Pat. No. 2,465,309 Happe, and in U.S. Pat. No. 2,589,822 by Kostka do not allow a drill output to be linked to either shaft of the angle attachment. Also these devices are not attachable to a drill body by a sleeve connector. A drill output can be linked to either shaft of the angle attachment with the device shown in U.S. Pat. No 2,604,795 by Ristow, and this device is secured to the drill body by a sleeve connector, but this device requires that the drill chuck be removed which is the problem to be overcome. This problem is also present in the devices shown by Keesling in U.S. Pat. No. 2,679,362 and shown by Babcock in U.S. Pat. No. 2,780,942.

None of the prior art devices suggest coupling either shaft of an angle attachment to a drill without removing the drill chuck while securing the angle attachment to the drill using a sleeve connector.

SUMMARY OF THE INVENTION

Objects of this invention comprise requirements listed in the following imperatives. Couple an angle attachment to a drill without removing the drill chuck. Couple either shaft of the angle attachment to the drill. Secure the angle attachment to the drill body using a sleeve connector. Couple existing angle attachments in this manner. Tighten the sleeve connector using the drill chuck key. Make it easy to gang two or more angle attachments in series.

Other objects will be comprehended in the drawings and detailed description, which will make additional objects obvious hereafter to persons skilled in the art.

In summary one embodiment of this invention comprises a coupler having a shaft which is removably secured in a drill chuck and having a socket which is removably seated onto a nut on either shaft of the angle attachment, a sleeve which secures the drill body to the angle attachment, and an attachment chuck removably attached onto the angle attachment shaft which is not seated in the coupler.

Other equivalent embodiments will be comprehended in the drawings and detailed description, which will make additional equivalent embodiments obvious hereafter to persons skilled in the art.

BRIEF DESCRIPTION OF THE DRAWINGS

FIG. 1 shows an angle attachment coupled to a drill.

FIG. 2 shows the coupler which couples rotation of the drill chuck to an input shaft of the angle attachment.

FIG. 3 shows the bolt tightening the split sleeve.

DESCRIPTION OF THE PREFERRED EMBODIMENTS

An angle attachment 10 is shown attached to a drill body 71 in FIG. 1. The angle attachment has a first threaded shaft 11 and a second threaded shaft 21. A first nut 12 is attached to the first shaft and a second nut 22 is attached to the second shaft. These threaded shafts 11 and 21 are generally identical in size and form to each other and to the drill output shaft 74. Also the nuts 12 and 22 are generally identical in size and form to each other and to a drill output shaft nut 75 which is attached to the drill output shaft 74. A drill chuck 73 is threaded onto the drill output shaft 74. The angle attachment has a first rim 13 on the angle attachment near the first threaded shaft and a second rim 23 on the angle attachment near the second threaded shaft. The first rim 13 and the second rim 23 are generally identical in size and form to each other and to a drill body rim 72 on the drill body.

An attachment chuck 31 is threaded onto the second threaded shaft 21 by holding the nut 22 motionless and rotating the attachment chuck onto the threads. The attachment chuck can also be threaded onto the first threaded shaft 11 using the nut 12 in the same way.

A coupler shaft 43—also shown in FIG. 2—is secured in the drill chuck 73 and a coupler socket 41 is seated onto the first nut 12 with the first threaded shaft 11 located in a coupler cavity 42. This couples the angle attachment to the drill chuck 73 so that rotation of the drill chuck is transmitted to the first nut 12 and thus to the first threaded shaft 11. The first threaded shaft transmits rotation to a first gear 14 which transmits rotation to a second gear 24. The second gear transmits rotation to the second threaded shaft 21 and thus to the attachment chuck 31. Bearings and other well known parts for transmission of rotary motion are not shown. The preferred forms of the cross sections of the nuts, 12 and 22 and of the coupler shaft 43 are hexagonal as shown, but other forms can be used.

A sleeve 45 has a first end 51 secured onto the first rim 13 on the angle attachment 10 near the first threaded shaft 11 and has a second end 61 secured onto the drill body rim 72 on the drill body 71. The sleeve secures the angle attachment in fixed relation to the drill body which means that there is no linear motion and no rotation of the angle attachment relative to the drill body while the rotation of the drill chuck is coupled to first nut 12. The sleeve is generally in the form of a right circular cylinder and is split laterally as shown in FIG. 3. The first rim on the angle attachment and the drill body rim on the drill body are have the same form as the inside of the sleeve and have cross sections just fitting inside of the sleeve. The sleeve is secured to the first rim 13 by tightening a bolt 54 passing through a first sleeve ear 53 and threaded into a first threaded sleeve ear 52 as shown in FIG. 3. In the same manner the sleeve is secured to the drill rim 72 by tightening a bolt 64 passing through a second sleeve ear 63 and threaded into a second sleeve threaded ear (not visible). The heads of bolts 54 and 64 are formed so that the bolts can be tightened using the chuck key (not shown) which is used with the attachment chuck. The cross sections of the inside of the sleeve, the first rim and the second rim on the angle attachment, and the drill body rim can be other than circular.

In the configuration shown in FIG. 1 the first threaded shaft 11 is an input shaft, the second threaded shaft 21 is an output shaft, the first nut 12 is an input nut, the second nut 22 is an output nut, the first rim 13 is an input rim, and the second rim 23 is an output rim. Typically the gears 14 and 24 provide that the rotational speed of the second threaded shaft is two thirds of the rotational speed of the first threaded shaft. Thus, when the first threaded shaft is an input shaft and the second threaded shaft is an output shaft as shown, then the rotational speed of the second chuck is two thirds of the rotational speed of the drill chuck.

Because the shafts, 11 and 21, the nuts 12 and 22, and the rims 13 and 23 are respectively generally identical in size and form, the second threaded shaft 21 can be used as an input shaft with the first threaded shaft 11 then being an output shaft. Then, correspondingly, the second nut 22 is an input nut, the first nut 12 is an output nut, the second rim 23 is an input rim, and the first rim 13 is an output rim. By securing the coupler shaft 43 in the drill chuck 73, seating the coupler socket 41 onto the second nut 22, securing the sleeve first end 51 to the second rim 23 on the angle attachment, and threading the attachment chuck 31 onto the first threaded shaft 12, the second threaded shaft is an input shaft and the rotational speed of the attachment chuck on the output shaft—now the first threaded shaft 11—is three halves of the rotational speed of the drill chuck.

The coupling in this invention—from drill chuck through coupler to angle attachment to attachment chuck—allows a second angle attachment to be ganged in series with ease. To do this a second coupler shaft is secured in the attachment chuck and a second sleeve is secured to the second angle attachment and to the angle attachment with the rotation of the drill chuck now being transmitted through two angle attachments to a second attachment chuck. Various numbers of angle attachments can be ganged in series in this way, and various speed ratios can be obtained by choosing which threaded shaft of an angle attachment is the input shaft.

Other equivalent forms for the angle attachment, the threaded shafts, the nuts attached to the threaded shafts, the coupler, the sleeve, and the rims and other equivalent connections among these elements will be obvious hereafter to persons skilled in the art. Therefore this invention is not limited to the particular examples shown and described here.

I claim:

1. In combination with a drill, the drill having a drill body and having a drill chuck attached, an angle attachment coupling comprising:

an angle attachment, the angle attachment having an input shaft, having an output shaft, and having an input nut attached to the input shaft;

a coupler, the coupler having a socket which is removably seated onto the input nut and having a coupler shaft which is removably secured in the drill chuck; and a sleeve, the sleeve having a first end which is removably secured onto an input rim on the angle attachment and having a second end which is removably secured onto a drill body rim on the drill body so that the angle attachment is held in fixed relation to the drill body while the coupler transmits rotation of the drill chuck to the input nut.

2. The coupling of claim 1 further comprising an attachment chuck which is removably attached onto the output shaft.

3. The coupling of claim 1 wherein the sleeve is secured onto the input rim by tightening a first bolt using a chuck key and the sleeve is secured onto drill body rim by tightening a second bolt using the chuck key.

4. The coupling of claim 2 wherein the sleeve is secured onto the input rim by tightening a first bolt using a chuck key and the sleeve is secured onto drill body rim by tightening a second bolt using the chuck key.

5. The coupling of claim 2 wherein the angle attachment has an output nut attached to the output shaft, the output nut being generally identical in size and form to the input nut, and the output shaft being generally identical in size and form to the input shaft.

6. In combination with a drill, the drill having a drill body and having a drill chuck attached, an angle attachment coupling comprising:

an angle attachment, the angle attachment having an input shaft, having an output shaft, having an input nut attached to the input shaft, having an output nut attached to the output shaft, and having an attachment chuck removably attached to the output shaft, the output shaft being generally identical in size and form to the input shaft, and the output nut being generally identical in size and form to the input nut;

a coupler, the coupler having a socket which is removably seated onto the input nut and having a coupler shaft which is removably secured in the drill chuck; and a sleeve, the sleeve having a first end which is removably secured onto an input rim on the angle attachment and having a second end which is removably secured onto a drill body rim on the drill body so that the angle attachment is held in fixed relation to the drill body while the coupler transmits rotation of the drill chuck to the input nut, the sleeve being secured onto the input rim by tightening a first bolt using a chuck key and the sleeve being secured onto drill body rim by tightening a second bolt using the chuck key.

7. A method for coupling an angle attachment to a drill, the drill having a drill body and having a drill chuck attached, comprising the steps:

providing an angle attachment coupling comprising;

an angle attachment, the angle attachment having an input shaft, having an output shaft, having an input nut attached to the input shaft, having an output nut attached to the output shaft, and having an attachment chuck removably attached to the output shaft, the output shaft being generally identical in size and form to the input shaft, and the second nut being generally identical in size and form to the first nut;

a coupler, the coupler having a socket which is removably seatable onto the input nut and having a coupler shaft which is removably securable in the drill chuck; and;

a sleeve, the sleeve having a first end which is removably securable onto an input rim on the angle attachment and having a second end which is removably securable onto a drill body rim on the drill body so that the angle attachment is held in fixed relation to the drill body while the coupler transmits rotation of the drill chuck to the input nut;

securing the coupler in the drill chuck;

seating the coupler onto the input nut;

securing the sleeve onto the input rim; and securing the sleeve onto the drill body rim with the angle attachment held in fixed relation to the drill body while the coupler transmits rotation from the drill chuck to the input nut.

* * * * *